(12) United States Patent
Bunker

(10) Patent No.: US 10,767,489 B2
(45) Date of Patent: Sep. 8, 2020

(54) COMPONENT FOR A TURBINE ENGINE WITH A HOLE

(71) Applicant: General Electric Company, Schenectady, NY (US)

(72) Inventor: Ronald Scott Bunker, Placitas, NM (US)

(73) Assignee: General Electric Company, Schenectady, NY (US)

( * ) Notice: Subject to any disclaimer, the term of this patent is extended or adjusted under 35 U.S.C. 154(b) by 734 days.

(21) Appl. No.: 15/238,058

(22) Filed: Aug. 16, 2016

(65) Prior Publication Data

US 2018/0051567 A1    Feb. 22, 2018

(51) Int. Cl.
| | |
|---|---|
| *F01D 5/18* | (2006.01) |
| *F01D 9/04* | (2006.01) |
| *F01D 11/08* | (2006.01) |
| *F01D 25/12* | (2006.01) |
| *F01D 25/14* | (2006.01) |

(Continued)

(52) U.S. Cl.
CPC ............ *F01D 5/186* (2013.01); *F01D 9/041* (2013.01); *F01D 11/08* (2013.01); *F01D 25/12* (2013.01); *F01D 25/14* (2013.01); *F02C 7/18* (2013.01); *F23R 3/002* (2013.01); *F23R 3/06* (2013.01); *F05D 2220/323* (2013.01); *F05D 2240/12* (2013.01); *F05D 2240/128* (2013.01); *F05D 2240/30* (2013.01); *F05D 2240/35* (2013.01); *F05D 2250/13* (2013.01); *F05D 2250/141* (2013.01); *F05D 2260/202* (2013.01); *F05D 2300/514* (2013.01); *F23R 2900/03042* (2013.01); *Y02T 50/672* (2013.01); *Y02T 50/676* (2013.01)

(58) Field of Classification Search
CPC .......... F01D 5/186; F01D 9/041; F01D 11/08; F01D 25/12; F01D 25/14; F01D 5/183; F01D 25/08; F02C 7/18; F23R 3/002; F23R 3/06; F23R 2900/03042; F05D 2220/323; F05D 2240/12; F05D 2240/128; F05D 2240/30; F05D 2240/35; F05D 2250/13; F05D 2250/141; F05D 2260/202; F05D 2300/514
USPC .............................................. 416/1, 95, 97 A
See application file for complete search history.

(56) References Cited

U.S. PATENT DOCUMENTS 4,422,229 A * 12/1983 Sadler ..................... F01D 5/183
164/112
4,529,358 A *  7/1985 Papell ..................... F01D 5/186
415/115

(Continued)

FOREIGN PATENT DOCUMENTS

| CN | 101852009 A | 10/2010 |
|---|---|---|
| JP | H0587339 A | 4/1993 |

OTHER PUBLICATIONS

Chinese Office Action corresponding to Chinese Application 201710702765.3 dated Feb. 2, 2019.

*Primary Examiner* — David E Sosnowski
*Assistant Examiner* — Danielle M. Christensen
(74) *Attorney, Agent, or Firm* — McGarry Bair PC

(57) ABSTRACT

An engine component, such as an airfoil, for a turbine engine having a hole, which can be a film hole, within the outer wall of the engine component where cooling air moves from an interior cavity through the hole to an outer surface of the engine component providing a cooling film on the outer surface of the engine component.

41 Claims, 13 Drawing Sheets

(51) Int. Cl.
  *F02C 7/18*   (2006.01)
  *F23R 3/00*   (2006.01)
  *F23R 3/06*   (2006.01)

(56) References Cited

U.S. PATENT DOCUMENTS

| | | |
|---|---|---|
| 5,326,224 A | 7/1994 | Lee et al. |
| 5,363,645 A | 11/1994 | Pellet |
| 5,641,014 A | 6/1997 | O'Connor et al. |
| 5,810,552 A | 9/1998 | Frasier |
| 6,255,000 B1 | 7/2001 | O'Connor et al. |
| 6,375,425 B1 | 4/2002 | Lee et al. |
| 6,443,700 B1 | 9/2002 | Grylls et al. |
| 6,461,107 B1 | 10/2002 | Lee et al. |
| 6,499,949 B2 | 12/2002 | Schafrik et al. |
| 6,551,061 B2 | 4/2003 | Darolia et al. |
| 6,617,003 B1 | 9/2003 | Lee et al. |
| 6,637,500 B2 | 10/2003 | Shah et al. |
| 6,905,302 B2 | 6/2005 | Lee et al. |
| 7,513,744 B2 | 4/2009 | Cunha et al. |
| 7,658,590 B1 | 2/2010 | Spanks |
| 8,387,245 B2 | 3/2013 | Bunker et al. |
| 8,499,566 B2 | 8/2013 | Lacy et al. |
| 8,528,208 B2 | 9/2013 | Rebak et al. |
| 8,575,513 B2 | 11/2013 | Abdo et al. |
| 8,628,293 B2 * | 1/2014 | Ramachandran ....... F01D 5/186 415/115 |
| 8,673,397 B2 | 3/2014 | Bunker et al. |
| 8,727,727 B2 | 5/2014 | Bunker et al. |
| 8,753,071 B2 | 6/2014 | Bunker |
| 8,815,371 B2 | 8/2014 | Arrell et al. |
| 8,974,859 B2 | 3/2015 | Bunker |
| 9,003,657 B2 | 4/2015 | Bunker et al. |
| 2010/0239412 A1 * | 9/2010 | Draper .................... F01D 5/186 415/115 |
| 2012/0084981 A1 * | 4/2012 | Arikawa ................. F01D 5/288 29/889.721 |
| 2015/0064019 A1 | 3/2015 | Lacy et al. |
| 2015/0321289 A1 | 11/2015 | Bruck et al. |

* cited by examiner

US 10,767,489 B2

COMPONENT FOR A TURBINE ENGINE WITH A HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Engine efficiency increases with the temperature of combustion gases. However, the combustion gases heat the various components along their flow path, which in turn requires cooling thereof to achieve a long engine lifetime. Typically, the hot gas path components are cooled by bleeding air from the compressor. This cooling process reduces engine efficiency, as the bleed air is not used in the combustion process.

Turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary turbine engine components, thin metal walls of high strength superalloy metals are typically used for enhanced durability while minimizing the need for cooling thereof. Various cooling circuits and features are tailored for these individual components in their corresponding environments in the engine. In addition, all of these components typically include common rows of film cooling holes.

A typical film cooling hole is a cylindrical bore inclined at a shallow angle through the heated wall for discharging a film of cooling air along the external surface of the wall to provide thermal insulation against the flow from hot combustion gases during operation. The film is discharged at a shallow angle over the wall outer surface to minimize the likelihood of undesirable blow-off, which would lead to flow separation and a loss of the film cooling effectiveness.

BRIEF DESCRIPTION OF THE INVENTION

In one aspect, the present disclosure relates to a component for a turbine engine comprising a wall separating a cooling airflow from a hot airflow having a first surface facing the cooling airflow and a second surface facing the hot airflow, at least one film hole extending through the wall and having an inlet located in the first surface and an outlet located in the second surface, with one of the inlet and outlet having a non-occluded portion, and a porous material located within the hole and at least partially defining a border of the non-occluded portion.

In another aspect, the present disclosure relates to a method of controlling the air momentum profile of a cooling air flow emitted from a hole with an inlet on a cooled surface of an engine component and an outlet on a heated surface of the engine component, the method comprising introducing a cooling air flow into the inlet of the hole and emitting the introduced cooling air flow through a partially-occluded portion of the hole defined by a porous material located in a sub-portion of the outlet to modify the momentum profile of the emitted cooling air flow passing through the porous material.

DESCRIPTION OF EMBODIMENTS OF THE INVENTION

Figure 1:
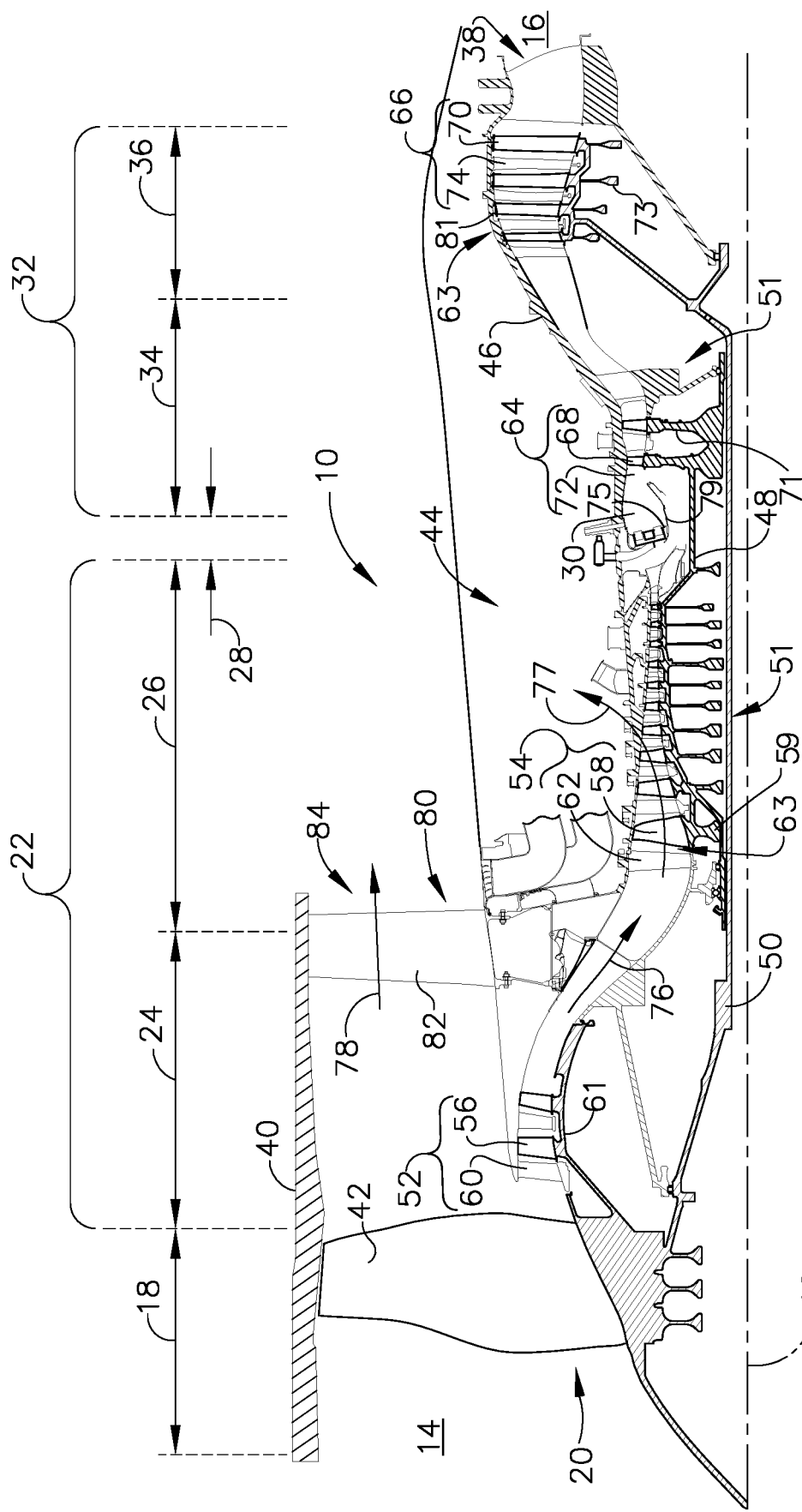
FIG. 1 is a schematic cross-sectional diagram of a turbine engine for an aircraft.

The described embodiments of the present invention are directed to the formation of a hole such as a film hole in an engine component such as an airfoil. Different embodiments described herein are towards forming a hole with at least a portion of the hole defining a partially-occluded portion formed of porous material. For purposes of illustration, the present invention will be described with respect to the turbine for an aircraft turbine engine. It will be understood, however, that the invention is not so limited and may have general applicability within an engine, including compressors, as well as in non-aircraft applications, such as other mobile applications and non-mobile industrial, commercial, and residential applications.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 51. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
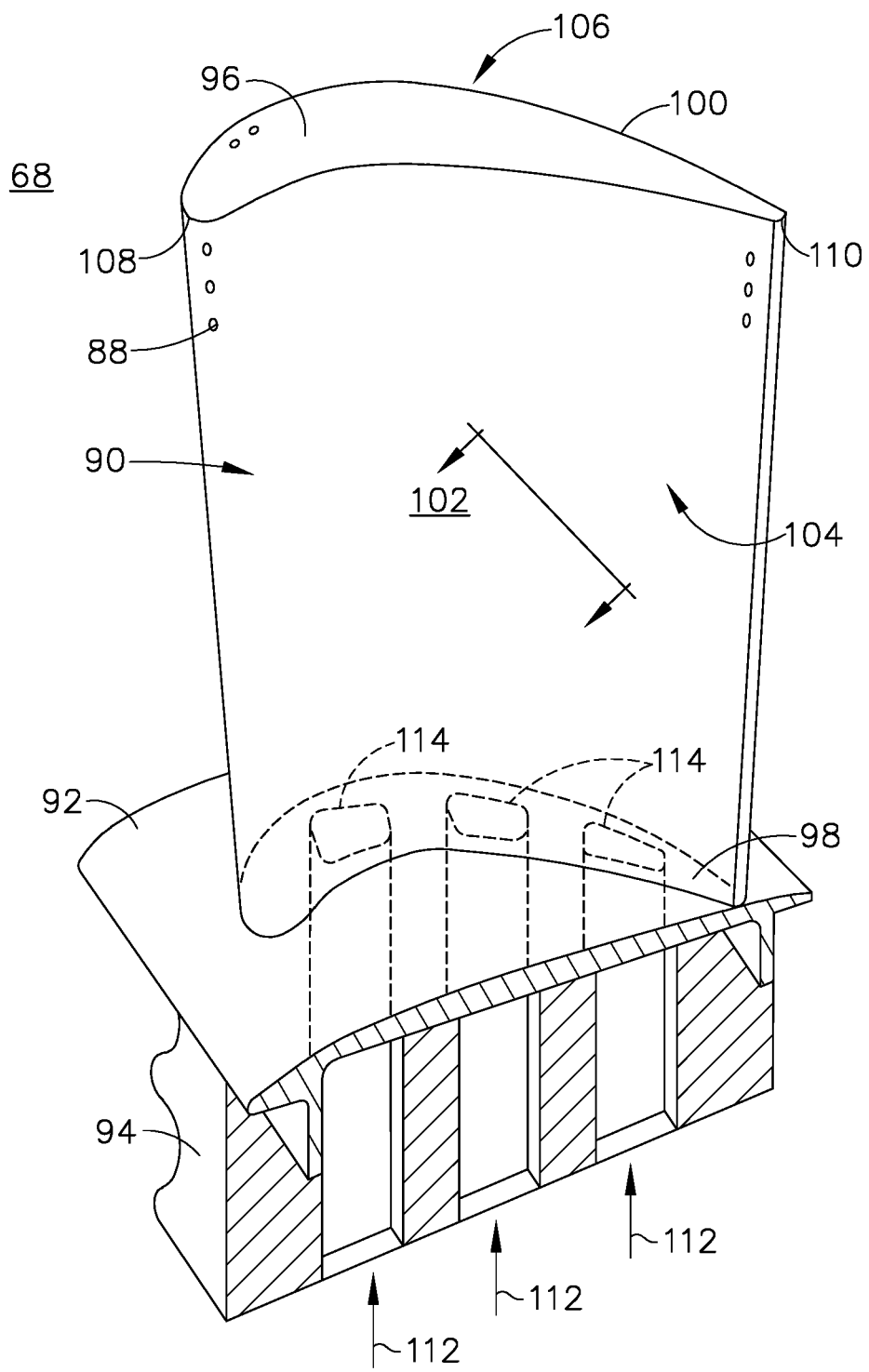
FIG. 2 is a perspective view of an airfoil for the turbine engine of FIG. 1.

FIG. 2 is a perspective view of an example of an engine component illustrated as an airfoil 90, a platform 92, and a dovetail 94, which can be a rotating blade 68, as shown in FIG. 1. Alternatively, it is contemplated that the airfoil 90 can be a stationary vane. The airfoil 90 includes a tip 96 and a root 98, defining a span-wise direction therebetween. Additionally, the airfoil 90 includes a wall 100. A hollow interior 102 is defined by the wall 100. A pressure side 104 and a suction side 106 are defined by the airfoil shape of the wall 100. The airfoil 90 further includes a leading edge 108 and a trailing edge 110, defining a chord-wise direction.

The airfoil 90 mounts to the platform 92 at the root 98. The platform 92 as shown is only a section, and can be an annular band for mounting a plurality of airfoils 90. The airfoil 90 can fasten to the platform 92, such as welding or mechanical fastening, or can be integral with the platform 92.

The dovetail 94 couples to the platform 92 opposite of the airfoil 90, and can be configured to mount to the disk 71, or rotor 51 of the engine 10 (FIG. 1), for example. The dovetail 94 can include one or more inlet passages 112, having an outlet 114 disposed at the root 98. It should be appreciated that the dovetail 94 is shown in cross-section, such that the inlet passages 112 are housed within the body of the dovetail 94. The inlet passages 112 can provide a cooling fluid flow C to the interior 102 of the airfoil 90 for cooling of the airfoil 90 in one non-limiting example. It should be understood that while the description herein is related to an airfoil, it can have equal applicability in other engine components requiring cooling such as film cooling. Such engine components can include but are not limited to, a shroud, a blade, a vane, or a combustion liner.

It should be understood that the airfoil 90 an example of one of a plurality of engine components of the engine 10. One or more of the engine components of the engine 10 includes a film-cooled substrate, or wall, in which a film cooling hole, or hole, of an embodiment disclosed further herein may be provided. Some non-limiting examples of the engine component having a wall can include the blades 68, 70, vanes or nozzles 72, 74, combustor deflector 75, combustor liner 79, or shroud assembly 81, described in FIGS. 1-2. Other non-limiting examples where film cooling is used include turbine transition ducts and exhaust nozzles.

Figure 3:
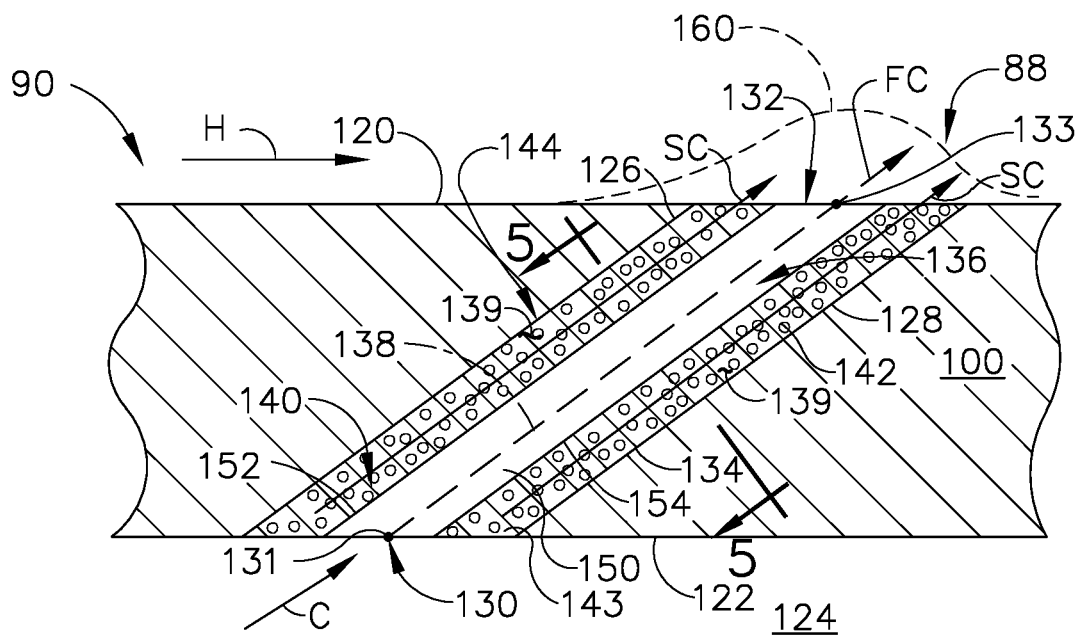
FIG. 3 is a sectional view through a first embodiment of a hole of an engine component of the engine from FIG. 1.

FIG. 3 is a cross-sectional view of a hole 88. In an exemplary embodiment the hole 88 is located in the leading edge 108 of the airfoil 90 of FIG. 2 where the wall 100 separates a hot airflow H from a cooling airflow C. A first surface or heated surface 120 faces the hot airflow H and a second surface or cooled surface 122 faces the cooling airflow C. As discussed herein with respect to FIGS. 1 and 2, in the context of a turbine engine, the cooling airflow C can be compressor air or ambient air supplied by the fan 20 which bypasses the engine core 44, air from the LP compressor 24, or air from the HP compressor 26.

The heated surface 120 can be an exterior surface of the airfoil 90. In the case of a turbine engine, the heated surface 120 may be exposed to gases having temperatures in the range of 1000° C. to 2000° C. Suitable materials for the wall 100 include, but are not limited to, steel, refractory metals such as titanium, or superalloys based on nickel, cobalt, or iron, and ceramic matrix composites. The superalloys can include those in equi-axed, directionally solidified, and single crystal structures. Protective coatings can be provided on the heated surface 120, such as but not limited to a thermal barrier coating. Thermal barrier coatings can be applied by various known methods in the art, including shadowing or masking methods so as to not block or plug the hole 88.

The hole 88 can extend through the wall 100 to provide fluid communication between an interior cavity 124 and the heated surface 120 of the airfoil 90. During operation, the cooling airflow C is supplied to the interior cavity 124 and emitted through the hole 88 to create a thin layer or film of cool air on the heated surface 120, protecting it from the hot airflow H. While only one hole 88 is shown in FIG. 3, it is understood that the airfoil 90 may be provided with multiple holes 88, which can be arranged in any desired configuration on the airfoil 90.

It is noted that, in any of the embodiments discussed herein, although the wall 100 is shown as being generally planar, it is understood that that the wall 100 may be curved for many engine components. However, the curvature of the wall 100 may be slight in comparison to the size of the hole 88, and so for the purposes of discussion and illustration, the wall 100 is shown as planar. Whether the wall 100 is planar or curved local to the hole 88, the first and second surfaces 120, 122 may be parallel to each other as shown herein, or may lie in non-parallel planes. The cavity 124, need not be the passage from which the cooling airflow C is supplied. The cavity 124 is an example, and it should be understood that the cooling airflow C can be supplied directly to the hole 88, where a wall divides a cooling airflow C from a hot airflow H.

The hole 88 can extend from an inlet 130 provided on the cooled surface 122 through the wall 100 to an outlet 132 provided on the heated surface 120. The hole 88 includes an inner surface 134 defining a passage 136 extending from the inlet 130 to the outlet 132. The inner surface 134 defines an upstream side 126 and a downstream side 128 of the passage 136. The passage 136 includes a passage centerline 138 where the passage centerline is linear and extends from a geometric center 131 of the cross-sectional area of the inlet 130 to a geometric center 133 of the cross-sectional area of the outlet 132.

A sub-portion 139 defining a partially-occluded portion 140 formed from a porous material 142 is located in the passage 136. The porous material 142 can define a body 144, for example but not limited to an annulus of porous material, extending from the inlet 130 to the outlet 132 along at least a portion of the inner surface 134 or along the entire length of the inner surface 134.

The porous material 142 can be any material, for example but not limited to Ni, NiCrAlY, or NiAl, with a porosity having a ratio of voids, or empty space, to solid material. The porosity determines the permeability of a volume of fluid, such as air, to flow through the porous material 142. The porosity of the material can be predetermined to enable a particular metering of the flow of the fluid passing through the porous material 142. The rate at which metering is needed for any particular geometry of the hole can be achieved using a porous material having a structured porosity or a random porosity or any combination thereof.

A structured porous material includes a determinative porosity throughout the material, which can have particular local increases or decreases in porosity to meter a flow of fluid passing through the structured porous material. Such local porosities can be determined and controlled during manufacture. Additive manufacturing can be used to form a structured porous material, in one non-limiting example. Alternatively, the porous materials can have a random porosity. The random porosity can be adapted to have a porosity as the average porosity over an area of the porous material, having discrete variable porosities that are random. A random porous material can be made from a nickel foam, in one non-limiting example.

The porous material 142 can be placed by, for example but not limited to, additive manufacturing wherein the porous material 142 is integrally formed with the wall 100. It is also contemplated that the porous material 142 can comprise an insert 143 located within the hole 88 wherein the insert 143 is secured to the inner surface 134 when the inlet 130 and outlet 132 are of a smaller diameter than the interior of the hole. The insert 143 can also be secured when a coating is placed on the first and second surfaces 120, 122 to secure the insert 143 within the hole 88. Examples described herein of securing the insert into the hole are for illustrative purposes only and not meant to be limiting.

The passage 136 further includes a non-occluded portion 150 wherein the partially-occluded portion 140 is circumscribing the non-occluded portion 150 such that the partially-occluded portion 140 forms the annulus body 144. The porous material 142 of the body 144 defines a border 152 of the non-occluded portion 150 wherein the border 152 comprises a perimeter 154 of the non-occluded portion 150, at the inlet 130, within the passage 136, and at the outlet 132.

A body axis 146 can be defined as for example but not limited to a volumetric center, center of mass, or geometric center of the porous material 142. The body axis 146 and the passage centerline 138 can overlap as illustrated or be parallel to each other, non-parallel to each other, diverge, converge, or have any other number of relationships with respect to each other.

The cooling fluid flow C can pass through the non-occluded portion 150 of the hole 88 as a first cooling fluid flow FC along the passage centerline 138. The hole 88 can be inclined in a downstream direction through the passage 136 such that the passage centerline 138 is non-orthogonal to the first and second surfaces 120, 122 and therefore cooling fluid flow C enters and exits the hole at an acute angle relative to the first surface 120 downstream of the outlet 132.

The cooling fluid flow C can also pass through the partially-occluded portion 140 of the hole 88 as a second cooling fluid flow SC. The porous material 142 will impeded the cooling fluid flow C, causing the cooling fluid flow C to modify the momentum profile such that the second cooling flow SC can have an emerging velocity that is less than that of the first cooling flow FC. It should be appreciated that a momentum profile 160 formed by the first and second cooling fluid flows FC, SC is three dimensional and highly complex. It is therefore contemplated that impeding or slowing the flow SC is a non-limiting example. It can be further contemplated that some portion of second cooling flow SC can have a greater momentum than the first cooling flow FC.

It should be noted that a variety of embodiments will be discussed herein and that like parts will maintain like numerals and newly introduced elements will be given a unique numerical value not yet used when discussing the embodiments. It should be understood that the description of the like parts of the various aspects described herein applies to the additional embodiments, unless otherwise noted.

Figure 4:
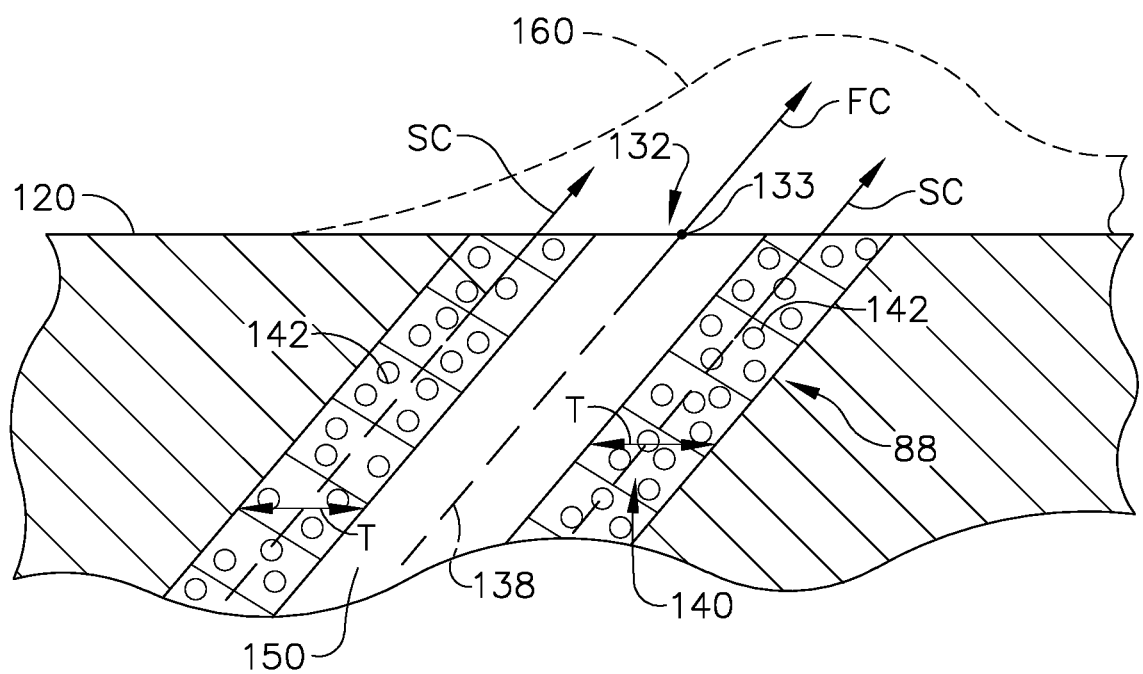
FIG. 4 is a sectional view of a momentum profile for emitted cooling air from the hole of FIG. 3.

Turning to FIG. 4, the first and second cooling fluid flows FC, SC together form the momentum profile 160 for the cooling air exiting hole 150. The momentum profile 160 forms and effective flow control structure that can be used to outwardly deflect the hot airflow H. In essence the momentum profile 160 can be used to represent a surface or shape that the hot airflow H contacts and flows over or around as the case may be. As illustrated, the momentum profile is such that the hot airflow H is deflected outward by the first and second cooling fluid flows FC, SC in a serial pattern, wherein the second cooling fluid flow SC first deflects the hot airflow H after which the first airflow FC deflects the hot airflow H an additional time. The serial deflection causes the hot airflow H to turn gradually resulting in a less turbulent intersection of airflows H and C as compared to when cooling air C is emitted from the outlet 132 with a nearly constant speed.

The hot airflow H will mix with the cooling fluid flow C as well, and it is further contemplated that the momentum profile 160 is a modification to decrease the amount that the hot airflow H and cooling fluid flow C mix. Mixing is greatest around the three-dimensional edges of the interaction, while not illustrated in the two dimensional FIGs. can be located at any point where the hot airflow H meets the first or second cooling fluid flows FC, SC. While the momentum profile 160 serves to deflect the hot airflow H, it also forms locations where mixing of the hot airflow H and the cooling fluid flow C occur, but to a lesser degree than in the absence of the momentum profile 160.

The physical characteristics of porous material 142 can be selected to control the shape of the momentum profile 160. For example, the extent of the porous material or the thickness T, can be constant or variable to alter the momentum profile 160. The extent to which the porous material fills the inlet 130, passage 136, and outlet 132 can be selected to control the momentum profile 160. The porosity can also be controlled. The porosity can also be constant or varying, especially in the structured porous material. The passages forming the porosity in the porous material can also be controlled to control where and in what direction the air is emitted from the porous material. The controlling influences the velocity of the air and the amount of the air moving through the hole 88, hence the momentum profile 160.

While the momentum profile 160 is shown as a bell-shaped profile, other profile shapes are contemplated. A more angular profile can be made, including a wedge. An airfoil profile is contemplated. The profile can be continuous or discontinuous. The profile can also be rectilinear or curvilinear. It should be understood, as described herein, that the profile is three-dimensional and that the examples are not meant to be limiting but are for illustrative purposes only for the two-dimensional description.

Figure 5:
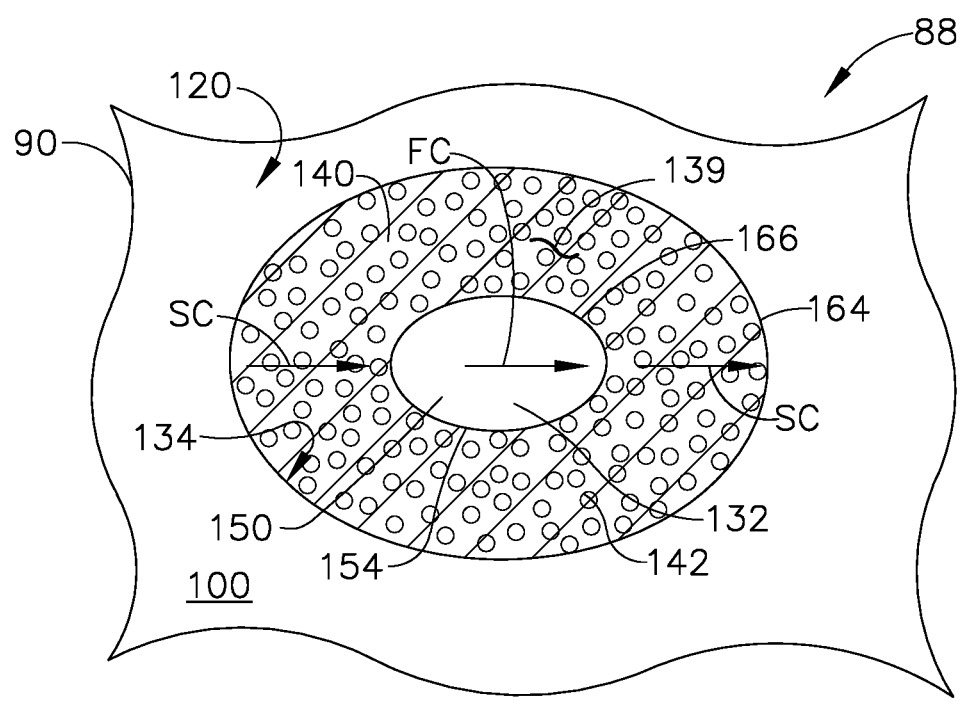
FIG. 5 is a plan view of the hole of FIG. 3.

FIG. 5 illustrates a cross-section of the outlet at an orientation perpendicular to the cross-section of FIG. 3 wherein the outlet 132 and the perimeter 154 of the non-occluded portion 150, formed by the circumscribing porous material 142, are concentric where the outlet 132 forms an outer circle 164 and the perimeter 154 forms an inner circle 166.

Figure 6:
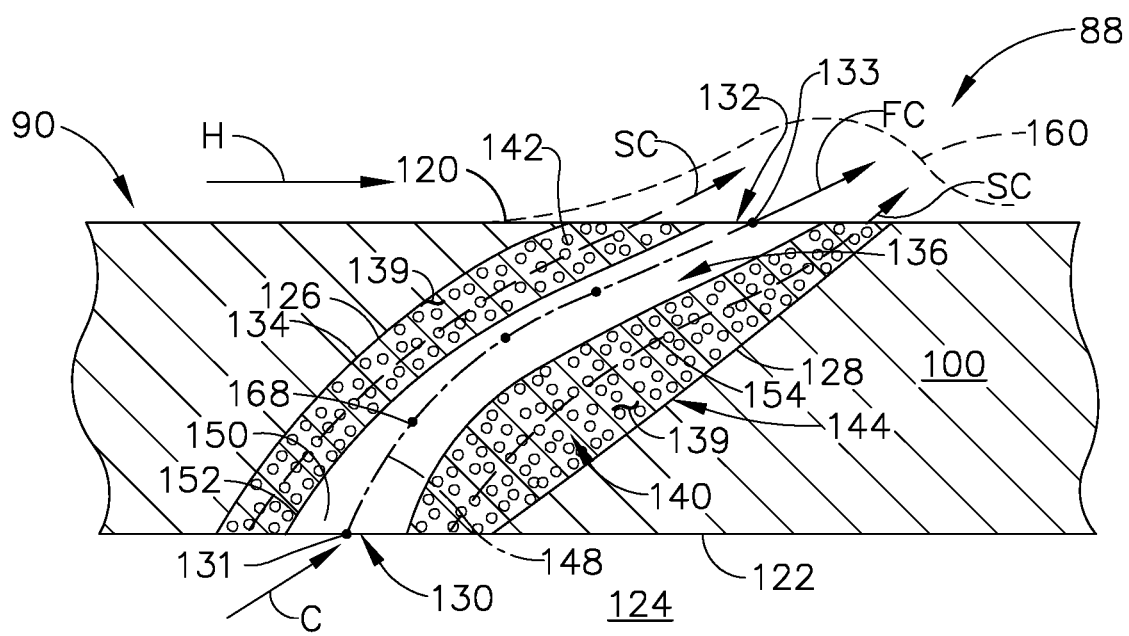
FIG. 6 is a sectional view through a second embodiment of a hole of an engine component of the engine from FIG. 1.

Alternatively as can be seen in FIG. 6, the hole 88 can have a non-linear passage centerline 148 defined as a line connecting a series of geometric central points 168 defining a volumetric center, center of mass, or the like of the passage 136. The non-linear passage centerline 148 can have a curvilinear form that is substantially orthogonal to one or both of the first and second surfaces 120, 122 in the localized area of one of the inlet 130 or outlet 132 through which the non-linear passage centerline 148 passes. It can also be contemplated that the non-linear passage centerline 148 meets one of or both of the inlet and outlet at an acute angle.

The body axis 146 can be parallel to the passage centerline 138 or the non-linear passage centerline 148 where the body axis 146 is one of a curvilinear or linear shape. It is also contemplated that the body axis 146 and the non-linear passage centerline 148 are non-parallel. The porous material 142 can have differing shapes when viewed in cross-sections taken at a point perpendicular to the body axis 146 and at the same point perpendicular to the non-linear passage centerline 148. It is also contemplated that the porous material 142 can have differing shapes when viewed in cross-sections taken at a point parallel to the body axis 146 and at the same point parallel to the non-linear passage centerline 148.

The non-occluded portion 150 can have varying widths at each of the central points 168 so as to form any shape, depending on the shape necessary for the particular application in which the hole 88 is being used.

The perimeter 154 of the non-occluded portion 150 is defined by the partially-occluded portion 140. The partially-occluded portion 140 can include areas of varying widths whilst still circumscribing the non-occluded portion 150.

At least one of the inner surfaces 134, for example but not limited to the upstream side 126, can have a curvilinear form paralleling the non-linear passage centerline 148.

It is further contemplated that both the non-linear and linear passage centerlines 138, 148 of the hole 88 may not be oriented in the direction of the hot combustion gas flow H, such that the vector of the cooling fluid flow C differs from that of the hot combustion gas flow H. For example, a hole 88 can have an outlet 132 oriented with a compound angle defining a cooling flow vector that differs from the hot combustion gas flow vector not only in cross-sectional view, but also in the top-down view looking at the heated surface 120.

Figure 7:
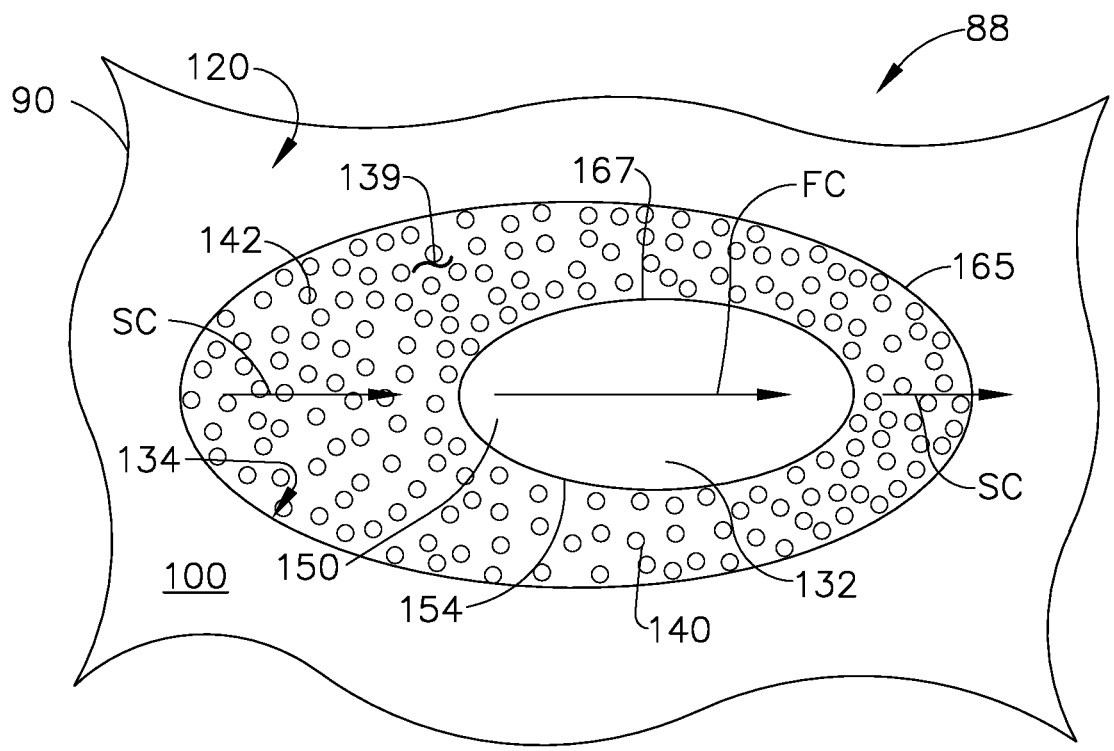
FIG. 7 is a plan view of the hole of FIG. 6.

Turning to FIG. 7, an example of an outlet 132 for the hole 88 of the second embodiment of FIG. 6 is illustrated. The perimeter 154 of the non-occluded portion 150 is substantially elliptical and the partially-occluded portion 140 is also substantially elliptical to form concentric outer and inner ellipses 165, 167. It should be understood that at any cross-section of the hole the partially-occluded 140 and non-occluded portions 150 can vary in width defining asymmetrical cross-sections. It should be further understood that the outlets 132 depicted in FIGS. 5 and 7 can be for either of the holes 88 depicted in FIGS. 3 and 5, and are for illustrative purposes only and not meant to be limiting.

Figure 8:
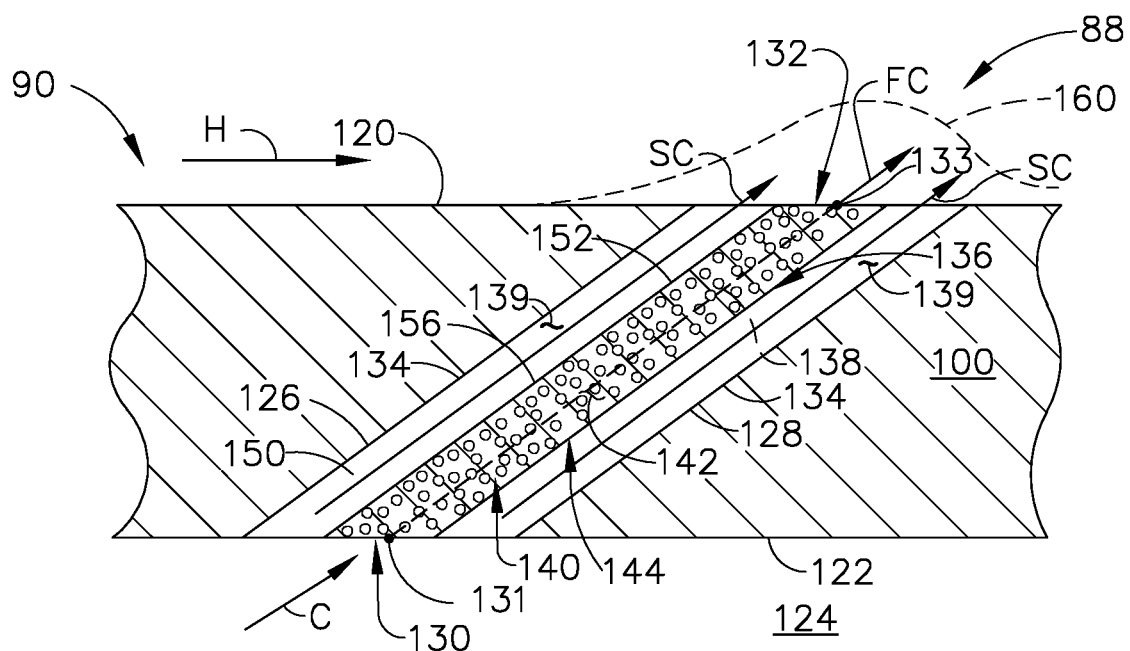
FIG. 8 is a sectional view through a third embodiment of a hole of an engine component of the engine from FIG. 1.

Turning to FIG. 8, in a third embodiment, the hole 88 cross-section is illustrated as the negative of the first embodiment described in FIG. 3 in that the sub-portion 139 defining the partially-occluded 140 portion in the first embodiment now defines the non-occluded portion 150 in the third embodiment. The passage centerline 138 is linear and passes through the partially-occluded portion 140 formed from the porous material 142. The porous material 142 defines the body 144 with a form of, for example but not limited to, a cylinder, trapezoid, cone, or sectioned cone, extending from the inlet 130 to the outlet 132 along at least a portion of the inner surface 134 or along the entire length of the inner surface 134.

The passage 136 further includes a non-occluded portion 150 extending from the inlet 130 to the outlet 132 along at least a portion of the inner surface 134 or along the entire length of the inner surface 134. The porous material 142 of the partially-occluded portion 140 defines a border 152 of the non-occluded portion 150 wherein the border 152 is an inner border 156 of the non-occluded portion 150.

Figure 9:
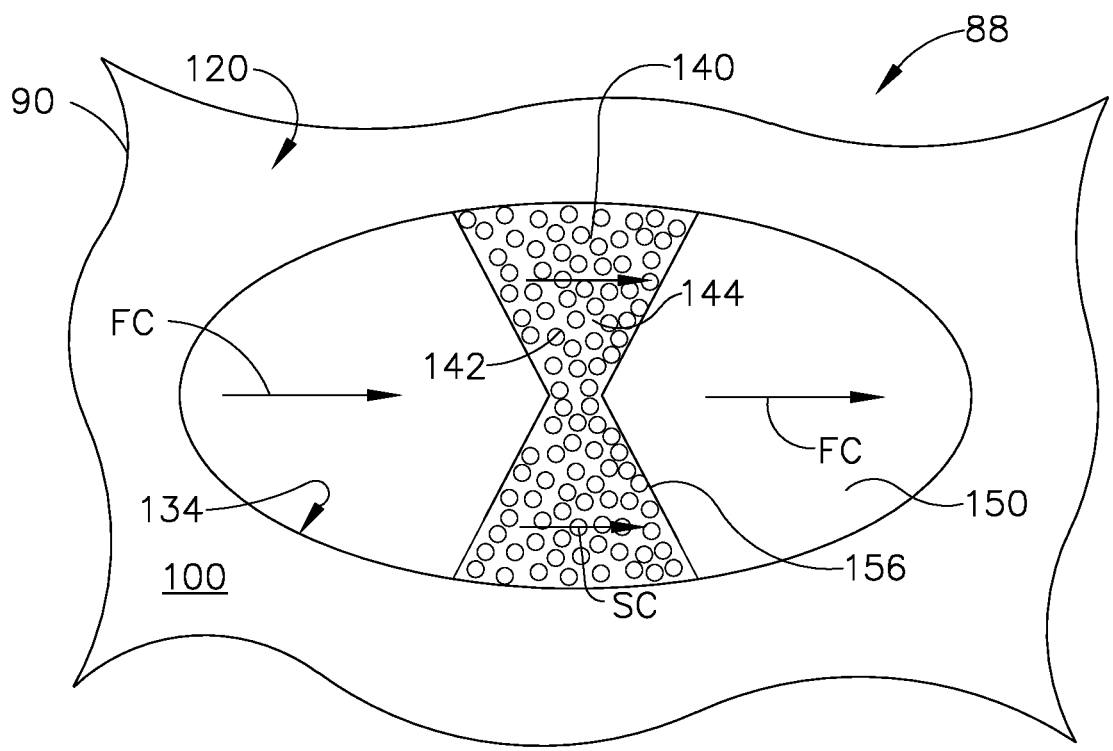
FIG. 9 is a plan view of the hole of FIG. 8.

FIG. 9 depicts for example but not limited to a cross-section of an outlet 132 of the third embodiment. The porous material 142 can have an hour-glass shape when viewed in cross-section looking at the outlet wherein a part of the partially-occluded portion 140 abuts the inner surface 134 and a part of the non-occluded portion 150 also abuts the inner surface 134. The porous material 142 is located in the middle of the outlet 132. The non-occluded portion is therefore located at both an upstream and downstream side of the outlet 132.

It should be understood that outlet cross-sections depicted in FIGS. 5, 7, and 9 are for illustrative purposes only and not meant to be limiting. For example, it can be contemplated that the hole 88 depicted in FIG. 3 can have an outlet 132 matching the description of FIG. 7, or a combination of FIGS. 5, 7, and 9.

Figure 10:
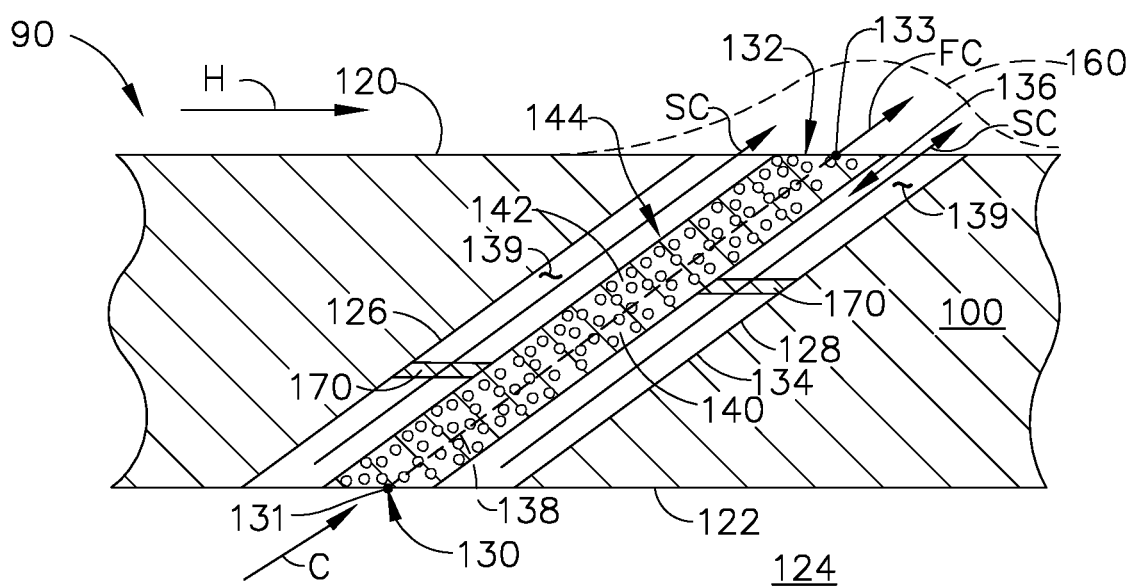
FIG. 10 is a sectional view through a fourth embodiment of a hole of an engine component of the engine from FIG. 1.

FIG. 10 illustrates a fourth embodiment of the hole 88 having similar geometry to the third embodiment with respect to placement of the partially-occluded portion 140. The partially-occluded portion 140 is a core body 144 of porous material 142 wherein at least one rib 170 is formed to extend from the inner surfaces 134 to the porous material 142 of the partially-occluded portion 140. The at least one rib 170 can extend from the upstream side 126, the downstream side 128, neither the upstream or downstream sides 126, 128, or both the upstream and downstream side 126, 128. The at least one rib 170 can be formed from the porous material 142, or from a non-porous material, for example but not limited to steel.

Figure 11:
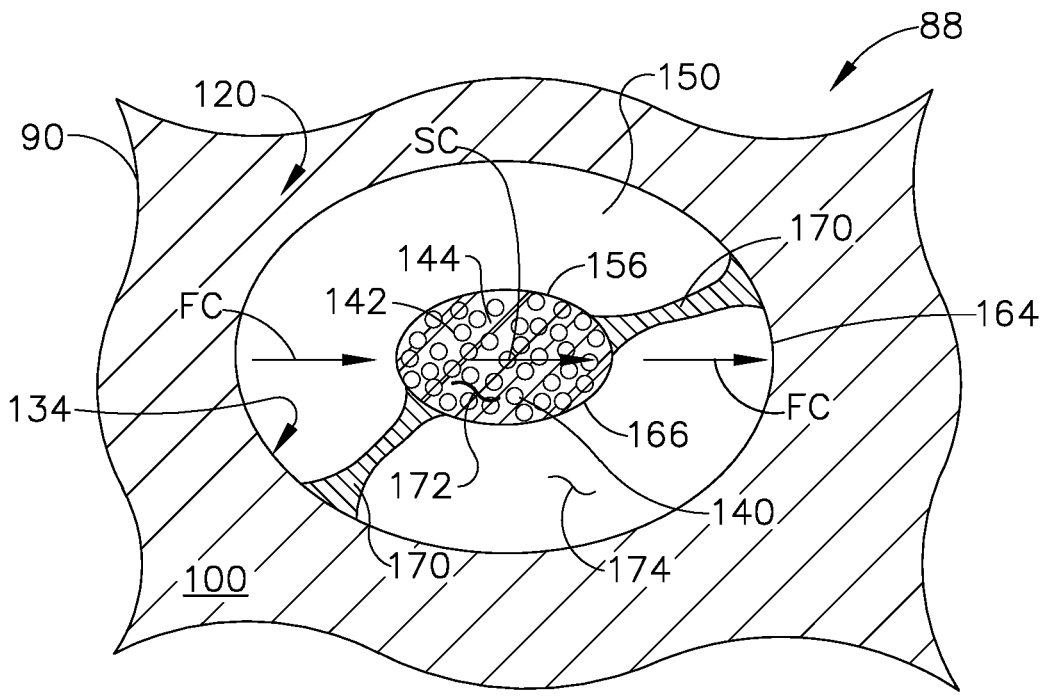
FIG. 11 is a plan view of the hole of FIG. 10.

FIG. 11 depicts an outlet cross-section for the hole 88 described in the fourth embodiment of FIG. 10. The illustration shows a cross-section of the outlet 132 at an orientation perpendicular to the cross-section of FIG. 10 wherein the inner surface 134 and the inner border 156 of the non-occluded portion 150, formed by centrally located porous material 142, are concentric within each other wherein the inner surface 134 forms an outer ellipse 165 and the inner border 156 forms an inner ellipse 167. The at least one rib 170 can extend from the inner surface 134 to the porous material 142 providing support to the partially-occluded portion 140.

It can be contemplated that the first and second cooling fluid flows SC, FC form a momentum profile 160 where slowed cooling fluid in the second cooling fluid flow SC are emitted from the outlet 132 at a centrally localized area 172 with respect to the outlet 132. The first cooling fluid flow FC is emitted from an area 174 surrounding the centrally localized area 172.

Figure 12:
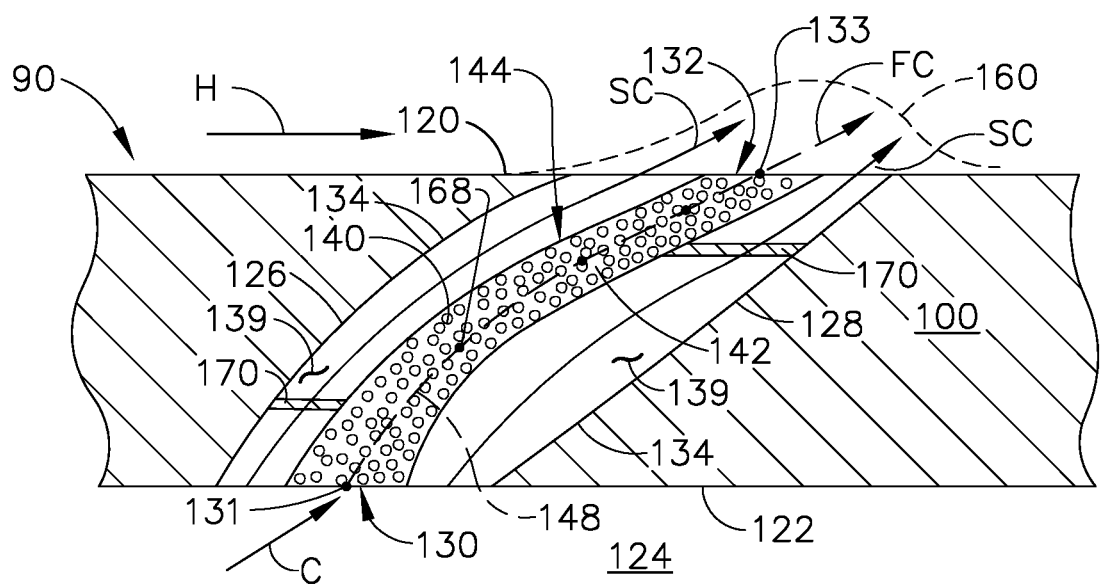
FIG. 12 is a sectional view through a fifth embodiment of a hole of an engine component of the engine from FIG. 1.

FIG. 12 is a fifth embodiment of the hole 88 cross-section illustrated as the negative of the second embodiment of the hole 88 as described in FIG. 7. It is contemplated that the occluded portion is supported by at least one rib 170 structurally similar to the fourth embodiment discussed in FIG. 9.

Figure 13:
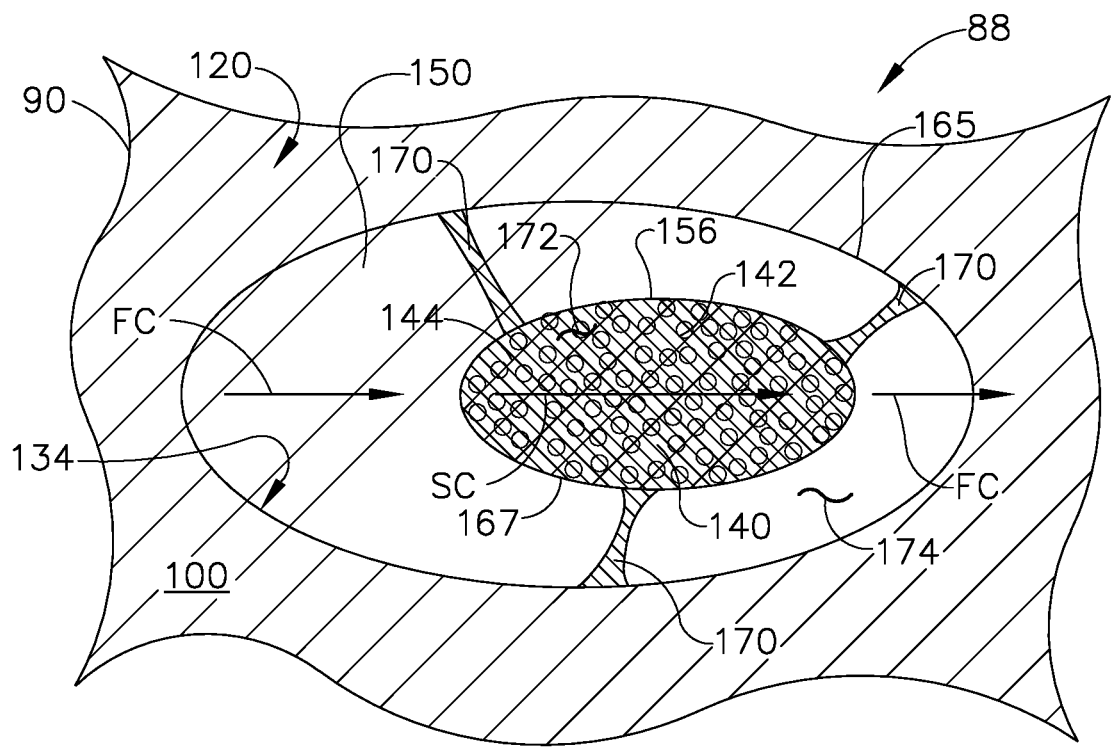
FIG. 13 is a plan view of the hole of FIG. 11.

FIG. 13 contemplates a cross-section of the outlet 132 of the fifth embodiment wherein the outlet 132 can have a form similar to the outlet 132 discussed in FIG. 7 and a function similar to the outlet 132 discussed in FIG. 11.

Figure 14:
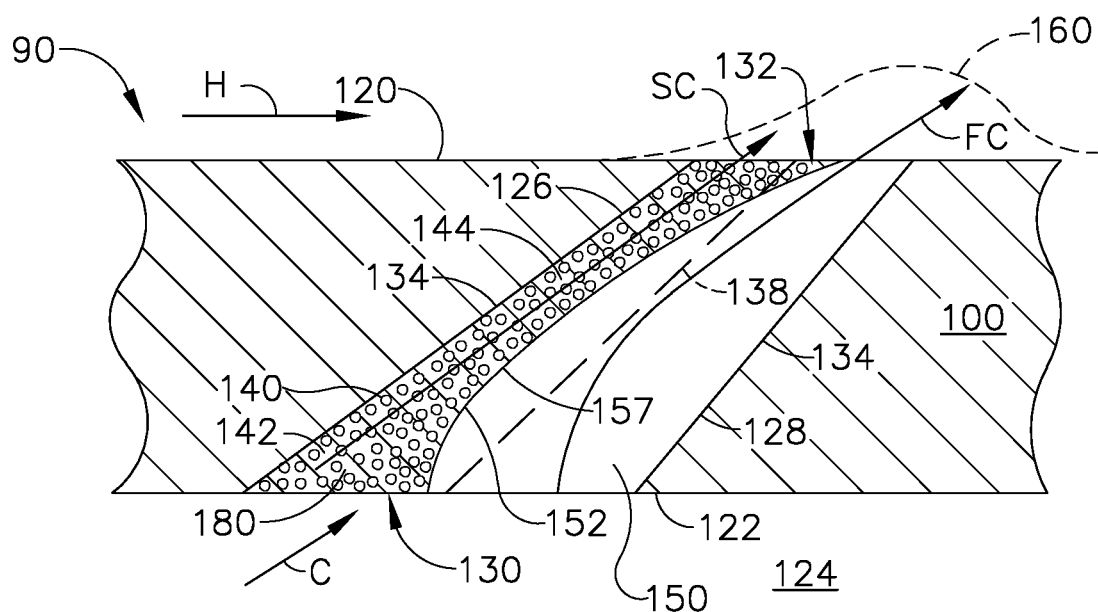
FIG. 14 is a top view of a sixth embodiment of a hole of an engine component of the engine from FIG. 1.

While embodiments described herein include cross-sections having a diverging geometry, FIG. 14 illustrates a converging geometry in a sixth embodiment of the hole 88 where the outlet 132 can have an effective diameter that is less than the inlet 130.

It is also contemplated that the porous material 142 can be located on a downstream side of the outlet 132 where the porous material 142 abuts at least a portion of the inner surface 134, wherein the portion is located on the upstream side 126 of the outlet 132. The partially-occluded portion 140 can vary in width and can be formed along at least a portion of the upstream side 126 or the entire upstream side 126 of the inner surface 134. The partially-occluded portion 140 can comprise a layup portion 180 formed on the upstream side 126 of the hole 88 wherein the layup portion 180 includes a curvilinear border defining an inner border 157 of the non-occluded portion 150 when viewed in cross-section.

It is further contemplated that the hole 88 can have a porous material 142 having a body axis 146 with a curvilinear form and a passage centerline 138 having with a linear form.

Figure 15:
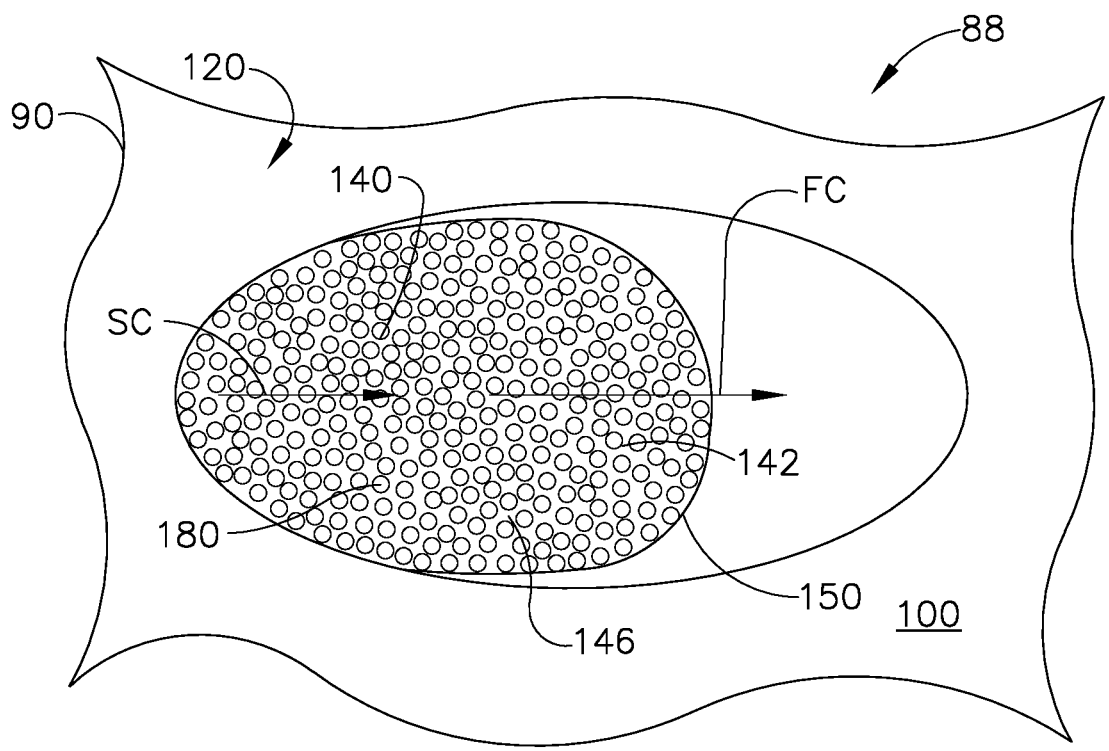
FIG. 15 is a plan view of the hole of FIG. 14.

FIG. 15 is an illustration of one example of an outlet 132 cross-section for the sixth embodiment. The outlet 132 can have an elliptical shape wherein the partially-occluded portion 140 is formed by porous material 142 having a circular cross-sectional shape at the outlet 132 on the downstream side of the outlet 132. While illustrated as a circular cross-section, it should be understood that the partially-occluded portion 140 can have a cross-section of any shape in order to form a body 144 extending at least partially into the passage 136. It should be further understood that while depicted on the upstream side 126, it can be contemplated that the partially-occluded portion 140 is located on the downstream side 128.

Figure 16:
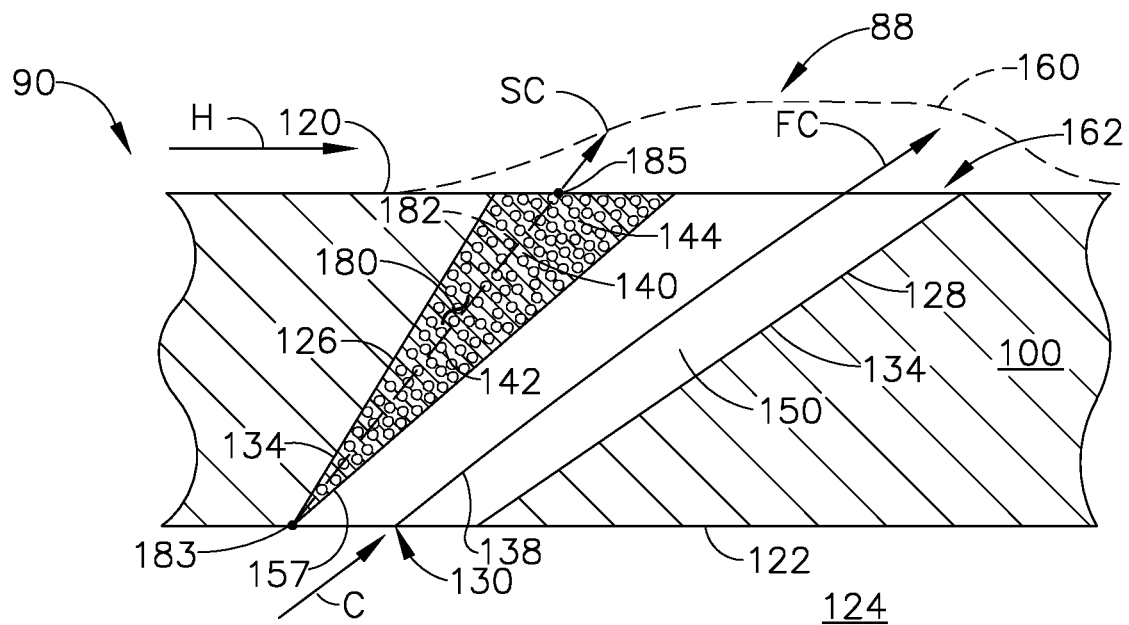
FIG. 16 is a sectional view through a seventh embodiment of a hole of an engine component of the engine from FIG. 1.

Turning to FIG. 16, a seventh embodiment of the hole 88 is contemplated with a diverging cross-section. The layup portion 180 is formed of porous material 142 and comprises the body axis 146 extending from the geometric center 183 of the porous material 142 at the inlet 130 to a geometric center 185 of the porous material 142 at the outlet 132. The body axis 146 and the passage centerline 138 are non-parallel so that the porous material 142 can be formed in, for example but not limited to, a conical body 144. A cross-section of the porous material 142 taken perpendicular to the body axis 146 of the hole 88 and one taken perpendicular to the passage centerline 138 would have a different shape. The non-occluded portion 150 can define the entire inlet 130, having no porous material 142 at the inlet 130, while the partially-occluded portion 140 defines at least $\frac{1}{3}^{rd}$ of the outlet 132.

Figure 17:
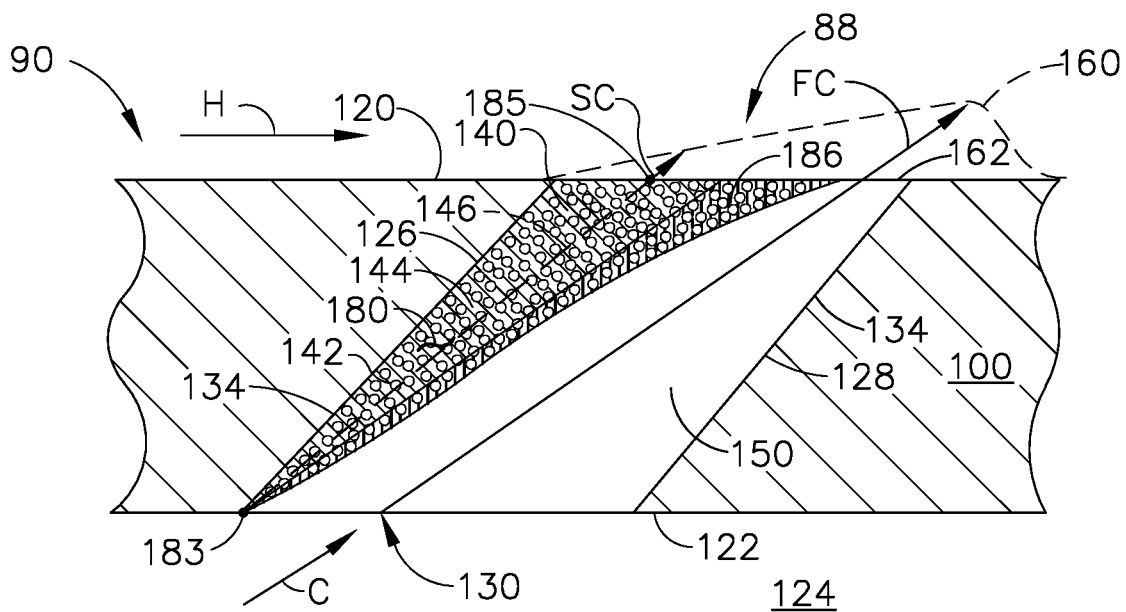
FIG. 17 is a sectional view through an eighth embodiment of a hole of an engine component of the engine from FIG. 1.

An eighth embodiment illustrated in FIG. 17, has similar geometry and function as the seventh embodiment. It is further contemplated in the eighth embodiment that a hood 186 can be formed either as part of or separate from and coupled to the partially-occluded portion 140. The hood 186 can be formed of porous material 142 or non-porous material, or can be two different porous materials with different porosities. The hood can have linear edges or curvilinear edges as depicted in FIG. 16.

Figure 18:
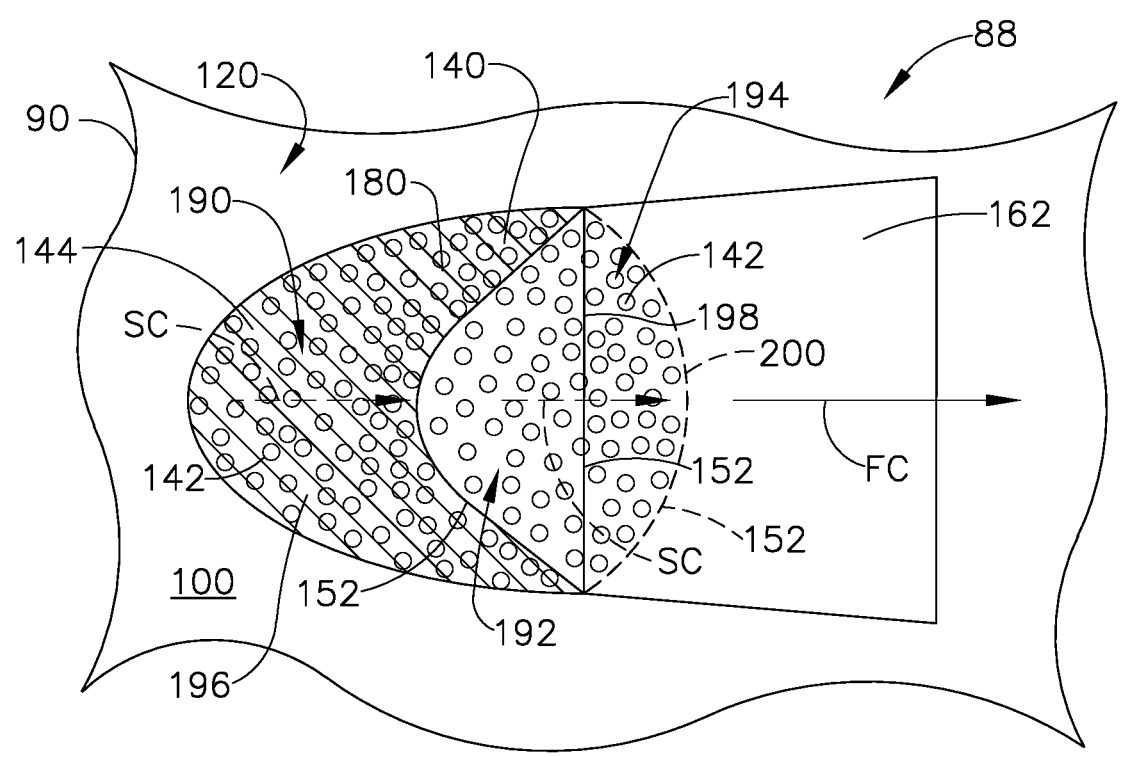
FIG. 18 is a top view of the holes of FIG. 16 and FIG. 17.

Turning to FIG. 18, a diffuser outlet 162 is illustrated. The diffuser outlet 162 can be for one of, for example but not limited to, the seventh and eighth embodiments. Three sections 190, 192, 194 of examples for placement of the porous material 142, non-porous material, or a combination of porous and non-porous material are shown. The partially-occluded portion 140 can terminate at the diffuser outlet 162 in a for example, but not limited to, crescent shape 196 as depicted in section one 190. It is also contemplated in section two that the partially-occluded portion 140 can be formed from porous material 142 having a linear edge 198 defining a border 152 of the non-occluded portion 150. Finally, the hood 186 can have any number of edges, for example but not limited to a convex curved edge 200 as shown in section three 190 illustrated by a dashed line. It should be understood that the porous material 142 can form the entirety of the partially-occluded portion 140, including the hood 186, as one continuous piece.

Figure 19:
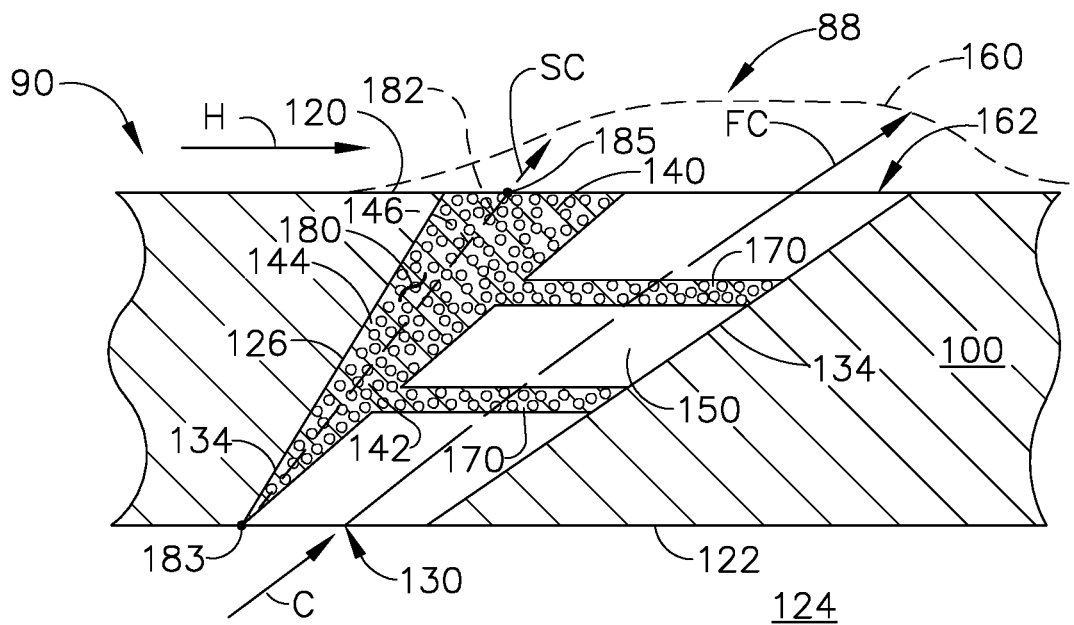
FIG. 19 is a sectional view through a ninth embodiment of a hole of an engine component of the engine from FIG. 1.

A ninth embodiment shown in FIG. 19, is of the hole 88 having a diverging cross-section is geometrically similar to the seventh embodiment discussed herein with an added structural component of at least one rib 170 extending from the porous material 142 to the downstream side 128 of the inner surface 134 of the hole 88.

Figure 20:
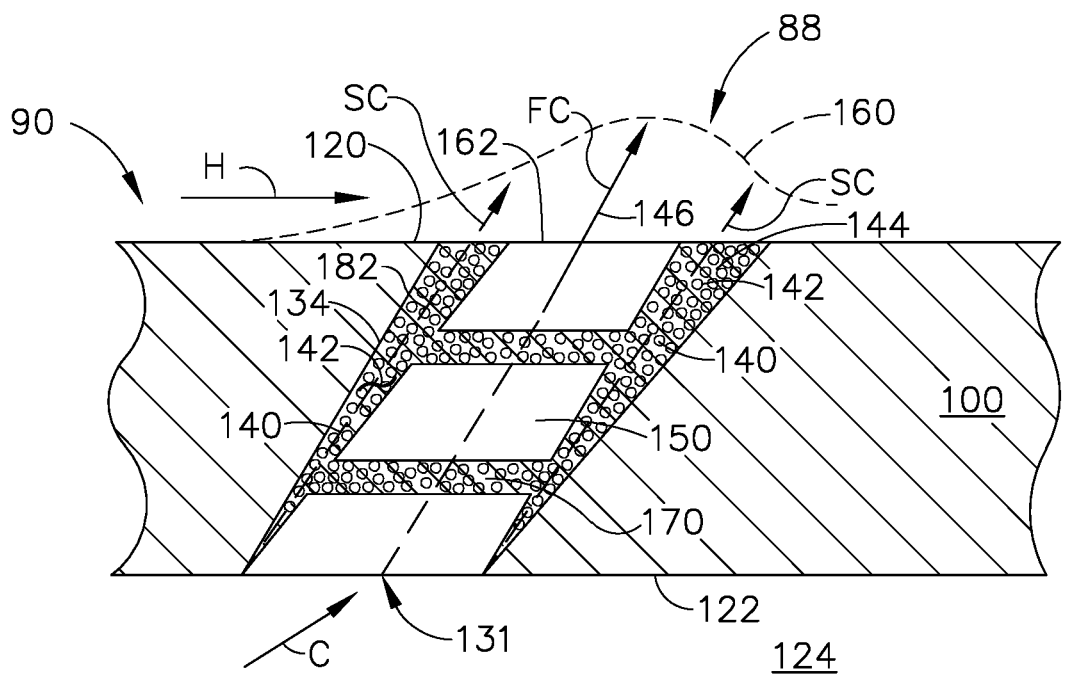
FIG. 20 is a sectional view through a tenth embodiment of a hole of an engine component of the engine from FIG. 1.

A tenth embodiment is contemplated in FIG. 20 having a diverging cross-section wherein porous material 142 is on both an upstream side 126 and a downstream side 128 of the inner surface 134 of the hole 88. It is further contemplated that at least one rib 170 extends from the porous material 142 on the upstream side 126 of the inner surface 134 to the porous material 142 on the downstream side 128 of the inner surface 134.

Figure 21:
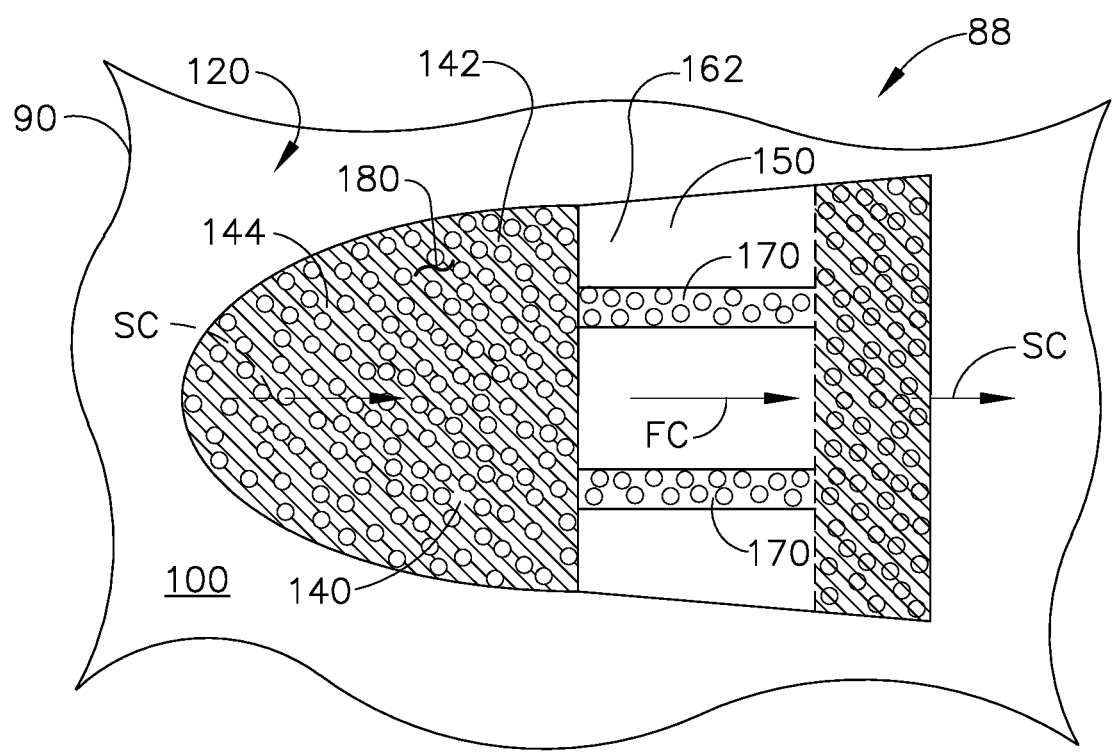
FIG. 21 is a top view of the holes of FIG. 19 and FIG. 20.

FIG. 21 is another diffuser outlet 162 cross-section depicting the porous material 142 on the upstream side 126 of the inner surface 134 and as, in the tenth embodiment, also on the downstream side 128 of the inner surface 134 as shown in dashed line. The at least one rib 170 extends from the porous material 142 and can vary in width, length and placement within the hole 88.

A method of controlling the momentum profile 160 of the cooling air flow C emitted from the hole 88 and having passed from the inlet 130 on the cooled surface 122 of the engine component to the outlet 114 on the heated surface 120 of the engine component includes introducing the cooling air flow C into the inlet 130 of the hole 88. Then emitting the introduced cooling air flow C through the partially-occluded portion 140 of the hole 88 defined by the porous material 142 located in a sub-portion 139 of the outlet 114 to slow the emitted cooling air C flow.

The method further includes passing the cooling air C through the partially-occluded portion 140 and the non-occluded portion 150. The partially-occluded portion 140 can circumscribe the non-occluded portion 150 forming an annulus of porous material 142, or the non-occluded portion can circumscribe the partially-occluded portion forming a core of porous material 142.

The method further includes emitting the cooling air C through the sub-portion 139 located on an upstream side 126 or downstream side 128 of the outlet 132. The outlet 132 can be the hole 88 having a diverging cross-sectional area.

Finally, the method can include controlling the air momentum profile 160 of the fluid emitted, in the form of cooling air C, from the outlet 114 by at least one of the porosity and location of the partially-occluded portion 140. The porosity of the porous material 142, as described herein, can be one of a structured or random make up and the location can be one of a plurality of possibilities described herein, for example but not limited to the annulus body 144 of porous material 142 and the core body 144 of porous material 142 within the sub-portion 139 of the hole 88.

It should be understood that any combination of portions of the embodiments described herein is also contemplated, and that the embodiments are for illustrative purposes only and not meant to be limiting.

Methods for forming the hole as described herein include but are not limited to additive manufacturing, machining via electrode, 3-D printing, SLA (Stereolithography), machining via a laser, coating, or by casting in.

Embodiments of the hole described herein can apply to straight or curved holes, any shaping, off-axis geometry, off-center geometry, converging, diverging, converging-diverging, etc. The description of the placement of porous material as described herein can be for any structure geometry of the porous region, as well as differing structures on various interior portions of the hole.

The hole described herein includes a portion of the perimeter or interior of the hole to be formed from structured porous material or from random porous material. The porous material serves to attenuate detrimental turbulence generated inside the holes, as well as at the inlets, which otherwise increases mixedness in the hot gas and decreases film effectiveness.

Additional benefits associated with the embodiments described herein include a higher cooling efficiency of the HP turbine and combustor. More effective film cooling for Hot Gas Path (HGP) components results in specific fuel consumption savings. The geometry and location of porous materials described herein are tolerant to manufacturing variations and misses, leading to longer life, fewer unexpected engine removals. Applies to all engines types using film-cooled components, including aviation, propulsion, and land-based electrical power generating turbines.

It should be appreciated that application of the disclosed design is not limited to turbine engines with fan and booster sections, but is applicable to turbojets and turbo engines as well.

It is intended that the following concepts can define at least a portion of the scope of the disclosure and that the apparatus and/or method(s) within the scope of these concepts and their equivalents be covered thereby. This disclosure should be understood to include all novel and non-obvious combinations of elements described herein, and the concepts may be presented in this or a later application to any novel and non-obvious combination of these elements. Any aspect of any embodiment can be combined any aspect of any of the other embodiments. Moreover, the foregoing embodiments are illustrative, and no single feature or element is essential to all possible combinations that may be included in this or a later application. For example, other inventions arising from this disclosure may include any combination of the following concepts set forth in bulleted form:

- A component for a turbine engine comprising a wall separating a cooling airflow from a hot airflow having a first surface facing the cooling airflow and a second surface facing the hot airflow, at least one film hole extending through the wall and having an inlet located in the first surface and an outlet located in the second surface, with one of the inlet and outlet having a non-occluded portion, and a porous material located within the hole and at least partially defining a border of the non-occluded portion and any of the following:
  - the inlet and the outlet have a non-occluded portion and the porous material at least partially defines a border for both of the non-occluded portions.
  - a second portion of the porous material is spaced from the inner surface defining the hole.
  - the porous material:
    - is an annulus of porous material
    - is a core of porous material
      - having at least a first portion abutting at least a portion of the inner surface
      - and the non-occluded portion comprise at least one of concentric circles or ellipses in cross-section.
      - and the non-occluded portion are concentric.
    - forms an occluded portion
    - defines at least a partial annulus of a non-occluded portion
    - extends through the hole from the inlet to the outlet.
    - comprises at least one of an annulus, cylinder, trapezoid, or a sectioned cone.
    - abuts an inner surface defining the hole.
    - comprises a cylinder, trapezoid, or sectioned cone.
    - is a sectioned cone.
    - is spaced from an inner surface defining the hole.
    - extends through the hole from the inlet to the outlet.
    - comprises at least one of an annulus, cylinder, trapezoid, or a sectioned cone.
    - abuts an inner surface defining the hole.
    - is spaced from an inner surface defining the hole.
    - is located within the film hole on one of an upstream side or downstream side of the outlet
    - is located in the inlet at an upstream side of the cooling airflow.
    - is located in the outlet at a downstream side of the hot airflow.
    - is located in the outlet at an upstream side of the hot airflow.
    - is located in the outlet in a middle of the outlet.
    - comprises an insert located within the hole.
      - the insert is secured to an inner surface forming the hole.
    - is integrally formed with the wall.
    - is randomly porous.
    - is structured porous.
  - the border is
    - a perimeter of the porous material.
    - in an inner border of the porous material.
    - an inner border.
    - a perimeter.
  - at least one rib extending from the inner surface to the porous material.
    - the rib comprises non-porous material.
    - the rib extends from the porous material to the wall.
    - the rib extends from the upstream side to the downstream side of the outlet.
  - the hole comprises a passage connecting the inlet and the outlet, with the passage having a non-occluded passage portion extending from the inlet to the outlet, and the porous material forms a border of the non-occluded passage portion.
    - the passage comprises a passage centerline and the porous material comprises a body axis.
    - the passage centerline and the body axis are non-parallel.
      - the body axis is curvilinear and the passage centerline is linear.
    - a passage cross section perpendicular to the passage centerline is different in shape than a porous material cross section perpendicular to the body axis at the same location in the hole.
      - the porous material is an annulus of porous material
      - the porous material is a core of porous material
    - a passage cross section parallel to the passage centerline is different in shape than a porous material cross section parallel to the body axis when the cross sections are in parallel planes.
      - the porous material is an annulus of porous material
      - the porous material is a core of porous material
  - the wall and porous materially are made by additive manufacturing.
  - the outlet is a diffuser shape
  - the non-occluded portion has a volume of at least $\frac{1}{3}^{rd}$ a volume of the porous material.
- A method of controlling a momentum profile of a cooling air flow emitted from a hole with an inlet on a cooled surface of an engine component and an outlet on a heated surface of the engine component, the method comprising introducing a cooling air flow into the inlet of the hole and emitting the introduced cooling air flow through a partially-occluded portion of the hole defined by a porous material located in a sub-portion of the outlet to modify the momentum profile of the emitted cooling air flow passing through the porous material.
  - the porous material is
    - an annulus of porous material
      - located on a downstream or upstream side of the outlet
    - a core of porous material
      - defining at least a partial annulus of a non-occluded portion controlling the momentum profile comprises:
emitting the introduced cooling air flow through a non-occluded portion of the hole and a partially-occluded first portion of the hole
emitting the cooling air through a porous material having a structured porosity.
emitting the cooling air through the sub-portion located on an upstream side of the outlet.
emitting the cooling air through the sub-portion located on a downstream side of the outlet.
emitting the cooling air through the hole having a diverging cross-sectional area.
emitting the cooling air flow through the annulus of porous material having at least one of a constant or varying thickness at the outlet.
passing the cooling air through the partially-occluded portion and a non-occluded portion.
passing the cooling air through the non-occluded portion and the first portion of porous material.
passing cooling air through a second portion of the porous material spaced from the inner surface defining the hole.
controlling the momentum profile of fluid emitted from the outlet by at least one of the porosity and location of the partially-occluded portion.
the passing the cooling air comprises passing cooling air through the:
partially-occluded portion circumscribing the non-occluded portion.
non-occluded portion circumscribing the partially-occluded portion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine comprising:
a wall separating a cooling airflow from a hot airflow having a first surface facing the cooling airflow and a second surface facing the hot airflow;
at least one film hole extending through the wall defining a passage extending between an inlet located in the first surface and an outlet located in the second surface, where the passage defines an inner surface having an upstream side and a downstream side with respect to the hot airflow, with one of the inlet and outlet having a non-occluded portion located on the downstream side; and
a porous material located within the hole extending along at least a portion of the upstream side of the passage with respect to the hot airflow and at least partially defining a border of the non-occluded portion;
wherein a remaining portion of the border is defined by the downstream side of the passage that is free of porous material.

2. The component of claim 1 wherein both the inlet and the outlet have a non-occluded portion and the porous material at least partially defines a border for both of the non-occluded portions.

3. The component of claim 2 wherein the porous material extends through the hole from the inlet to the outlet.

4. The component of claim 3 wherein the porous material comprises at least one of a trapezoid, or a sectioned cone.

5. The component of claim 3 wherein the porous material abuts an inner surface defining the hole.

6. The component of claim 1 wherein the porous material is spaced from an inner surface defining the hole.

7. The component of claim 1 wherein the porous material extends through the hole from the inlet to the outlet.

8. The component of claim 1 wherein the porous material comprises at least one of a trapezoid, or a sectioned cone.

9. The component of claim 1 wherein the porous material abuts an inner surface defining the hole.

10. The component of claim 1 wherein the porous material is spaced from an inner surface defining the hole.

11. The component of claim 1 further comprising at least one rib extending from an inner surface to the porous material.

12. The component of claim 1 wherein the hole comprises a passage connecting the inlet and the outlet, with the passage having a non-occluded passage portion extending from the inlet to the outlet, and the porous material forms a border of the non-occluded passage portion.

13. The component of claim 12 wherein the passage comprises a passage centerline and the porous material comprises a body axis.

14. The component of claim 13 wherein the passage centerline and the body axis are non-parallel.

15. The component of claim 14 wherein the body axis is curvilinear and the passage centerline is linear.

16. The component of claim 13 wherein a passage cross section perpendicular to the passage centerline is different in shape than a porous material cross section perpendicular to the body axis at the same location in the hole.

17. The component of claim 13 wherein a passage cross section parallel to the passage centerline is different in shape than a porous material cross section parallel to the body axis when the cross sections are in parallel planes.

18. The component of claim 1 wherein the porous material is located in the inlet at an upstream side of the cooling airflow.

19. The component of claim 18 wherein the porous material is located in the outlet at an upstream side of the hot airflow.

20. The component of claim 1 wherein the porous material comprises an insert located within the hole.

21. The component of claim 20 wherein the insert is secured to an inner surface forming the hole.

22. The component of claim 1 wherein the porous material is integrally formed with the wall.

23. The component of claim 22 wherein the wall and porous material are made by additive manufacturing.

24. The component of claim 1 wherein the porous material is randomly porous.

25. The component of claim 1 wherein the porous material is structured porous.

26. The component of claim 1 wherein the non-occluded portion has a volume of at least $\frac{1}{3}^{rd}$ a volume of the porous material.

27. The component of claim 1 further comprising a hood extending into the passage proximate the outlet.

28. The component of claim 27 wherein the hood is formed along the upstream side of the passage.

29. The component of claim 27 wherein the hood is formed of a porous material.

30. The component of claim 29 wherein the hood is formed of at least two porous materials with different porosities.

31. The component of claim 27 wherein the hood is formed of a non-porous material.

32. The component of claim 27 wherein the hood comprises a curved edge.

33. A method of controlling a momentum profile of a cooling air flow emitted from a hole defining a passage extending between an inlet on a cooled surface of an engine component and an outlet on a heated surface facing a hot airflow of the engine component where the passage defines an inner surface having an upstream side and a downstream side with respect to the hot airflow, the method comprising:
introducing a cooling air flow into the inlet of the hole,
emitting the introduced cooling air flow from a non-occluded portion of the hole along the downstream side of the passage free of porous material, and
emitting the introduced cooling air flow from a partially-occluded portion of the hole defined by a porous material located in a sub-portion of the outlet along the upstream side of the outlet to modify the momentum profile of the emitted cooling air flow passing through the porous material where the emitted cooling air flow from the porous material has an emerging velocity less than the cooling air flow emitted from the non-occluded portion.

34. The method of claim 33 wherein controlling the momentum profile comprises emitting the cooling air through a porous material having a structured porosity.

35. The method of claim 33 wherein controlling the momentum profile comprises passing the cooling air through the partially-occluded portion and a non-occluded portion.

36. The method of claim 35 wherein the passing the cooling air comprises passing cooling air through the partially-occluded portion circumscribing the non-occluded portion.

37. The method of claim 35 wherein the passing the cooling air comprises passing cooling air through the non-occluded portion circumscribing the partially-occluded portion.

38. The method of claim 33 wherein controlling the momentum profile comprises emitting the cooling air through a non-occluded portion located on a downstream side of the outlet.

39. The method of claim 33 wherein controlling the momentum profile comprises emitting the cooling air through the hole having a diverging cross-sectional area.

40. The method of claim 33 further comprising controlling the momentum profile of fluid emitted from the outlet by at least one of the porosity and location of the partially-occluded portion.

41. A component for a turbine engine comprising:
a wall separating a cooling airflow from a hot airflow having a first surface facing the cooling airflow and a second surface facing the hot airflow;
at least one film hole extending through the wall and having an inlet located in the first surface and an outlet located in the second surface, a passage connecting the inlet and the outlet, with the passage having a non-occluded passage portion extending from the inlet to the outlet; and with one of the inlet and outlet having a non-occluded portion; and
a porous material located within the hole forming a border of the non-occluded passage portion and at least partially defining a border of the non-occluded portion;
wherein the passage comprises a passage centerline, the porous material comprises a body axis, and a passage cross section is different in shape than a porous material cross section when either one of:
the passage cross section is perpendicular to the passage centerline at the same location in the hole as the porous material cross section; or
the passage cross section is parallel to the passage centerline, the porous material cross section is parallel to the body axis, and the cross sections are in parallel planes.

* * * * *